(12) United States Patent
Oki (10) Patent No.: US 10,209,107 B2
(45) Date of Patent: Feb. 19, 2019

(54) GEOMETRIC ERROR IDENTIFICATION METHOD OF MULTI-AXIS MACHINE TOOL AND MULTI-AXIS MACHINE TOOL

(71) Applicant: Okuma Corporation, Niwa-Gun (JP)

(72) Inventor: Tadahiro Oki, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 943 days.

(21) Appl. No.: 14/524,293

(22) Filed: Oct. 27, 2014

(65) Prior Publication Data

US 2015/0160049 A1 Jun. 11, 2015

(30) Foreign Application Priority Data

Dec. 5, 2013 (JP) ................................. 2013-252200

(51) Int. Cl.
*G01B 5/20* (2006.01)
*G01B 21/04* (2006.01)
(Continued)

(52) U.S. Cl.
CPC .............. *G01D 18/00* (2013.01); *G01B 5/004* (2013.01); *G01B 5/20* (2013.01); *G01B 21/042* (2013.01); *G05B 19/401* (2013.01); *G05B 19/404* (2013.01); *G05B 2219/39021* (2013.01); *G05B 2219/50139* (2013.01)

(58) Field of Classification Search
CPC .......... G01D 18/00; G01B 5/004; G01B 5/20; G01B 21/042
See application file for complete search history.

(56) References Cited

U.S. PATENT DOCUMENTS

| 5,189,627 A * | 2/1993 | Momochi | .......... G05B 19/4103 |
| | | | 318/573 |
| 9,266,209 B2 * | 2/2016 | Murahashi | ......... B23Q 11/0007 |

(Continued)

FOREIGN PATENT DOCUMENTS

| CN | 101992407 A | 3/2011 |
| JP | 03-040004 A1 | 2/1991 |

(Continued)

OTHER PUBLICATIONS

Japanese Office Action (Application No. 2013-252200) dated Jun. 27, 2017 (with English translation).

(Continued)

*Primary Examiner* — Janet L Suglo
(74) *Attorney, Agent, or Firm* — Burr & Brown, PLLC (57) ABSTRACT

A geometric error identification method of multi-axis machine tool includes a measuring step of indexing a position of a target ball mounted on one of a main spindle and a table into a plurality of angles around an rotation axis, and measuring the position of the target ball at respective indexed positions by using a touch probe mounted on the other one of the main spindle and the table, a geometric error calculation step of calculating a geometric error from the measured position of the target ball, an ellipse-expression calculation step of calculating an ellipse approximate expression by an arc trajectory measured by operating the rotation axis, and an error correcting step of calculating and correcting a scaling error of translation axes from the calculated ellipse approximate expression.

9 Claims, 4 Drawing Sheets

(51) Int. Cl.
*G01B 5/004* (2006.01)
*G01D 18/00* (2006.01)
*G05B 19/401* (2006.01)
*G05B 19/404* (2006.01)

(56) References Cited

U.S. PATENT DOCUMENTS

| | | | | |
|---|---|---|---|---|
| 2002/0067855 A1* | 6/2002 | Chiu | ............... | G06T 7/80 |
| | | | | 382/199 |
| 2005/0234671 A1* | 10/2005 | Morfino | ............ | G05B 19/4015 |
| | | | | 702/95 |
| 2006/0218811 A1* | 10/2006 | Sato | ............... | G05B 19/404 |
| | | | | 33/702 |
| 2011/0040523 A1* | 2/2011 | Matsushita | ............ | B23Q 17/22 |
| | | | | 702/152 |

FOREIGN PATENT DOCUMENTS

| | | | |
|---|---|---|---|
| JP | 2006-281335 | A1 | 10/2006 |
| JP | 2011-038902 | A1 | 2/2011 |

OTHER PUBLICATIONS

Chinese Office Action (and an English translation from the Global Dossier) from a corresponding Chinese patent application dated Sep. 20, 2017, 14 pages.

\* cited by examiner

GEOMETRIC ERROR IDENTIFICATION METHOD OF MULTI-AXIS MACHINE TOOL AND MULTI-AXIS MACHINE TOOL

BACKGROUND OF THE INVENTION

This application claims the benefit of Japanese Patent Application Number 2013-252200 filed on Dec. 5, 2013, the entirety of which is incorporated by reference.

TECHNICAL FIELD

The present invention relates to a method of identifying a geometric error of a multi-axis machine tool having two or more translation axes and at least one rotation axis, and relates to a multi-axis machine tool being capable of implementing the method.

DESCRIPTION OF RELATED ART

In machine tools, a multi-axis machine tool such as a 5-axis machining center, in which two rotation axes are added to a conventional 3-axis machining center, is desired to improve in accuracy for performing high-efficiency machining or machining of complex shape workpieces. In general, if the number of axes is increased, assembly becomes difficult and the accuracy tends to be lowered. However, since there is a limit in pursuing the accuracy in assembly, a correction system has been developed so as to improve accuracy by correcting an inclination between adjacent axes or positional error, namely, a geometric error.

As a conventional method of identifying the geometric error, a plurality of measuring instruments such as a displacement gauge or a square master are used to obtain the geometric error from a measured result. However, there are problems not only that the plurality of measuring instruments are necessary, but also uncertainty of measured result such as variation in read value depending on measuring skills has a significant effect on identification accuracy.

As a method of geometric error identification of the 5-axis machining center, measurement of simultaneous 3-axis arc interpolation motion by using a displacement sensor referred to as a ball bar is widely known. The method is a method of synchronizing 2-linear axes and 1-rotation axis to cause a circular motion so as to maintain a relative displacement between one point on a table and a main spindle, and identifying a geometric error from an amount of center deviation of an obtained circular trajectory. However, in this method, since a specific measuring instrument such as the ball bar is required, and an influence of a setting method of the measuring instrument on the identification accuracy is significant, the measurement cannot be performed easily.

In addition, the geometric error varies depending on causes such as a state of mounting the tool, and a thermal displacement due to a change in environmental temperature. Therefore, geometric error identification for performing a geometric error correction is desirably performed before performing high-accuracy machining. However, in the method described above, since a significant amount of time is required for measurement, a specific measuring instrument is required, and the identification accuracy depends on the measuring skill of a person who is in charge of measurement, implementation of the method is difficult.

Therefore, by using a touch probe mounted on the machine tool and a ball as a measurement target, a measurement system is developed on the basis of a geometric error identification principle which is similar to measurement of accuracy of simultaneous 3-axis arc interpolation motion using the ball bar (Japanese Patent Application Publication No. 2011-38902 (JP-A-2011-38902)). For example, in the case of a turning table type 5-axis machining center, a process as described below is repeated. The process is a process of installing a target ball on a table, indexing rotation axes and axes of pivotal movement into a plurality of angles, bringing the touch probe mounted on the main spindle into contact with the target ball on the table by a plurality of times on the respective indexing conditions, for example, indexing only the rotation axes by a plurality of times while fixing the axes of pivotal movement at a given angle, or indexing only the axes of pivotal movement by a plurality of times while fixing the rotation axes at a given angle, and calculating a center coordinate and a diameter of the ball. The geometric error is identified from the amount of the center deviation of an arc trajectory drawn on the plurality of indexing conditions from the measured position of the ball.

A geometric error measurement system is a function to identify six components of a translation error and a rotation error in a relationship between the adjacent axes, that is, in a positional relationship between a certain axis and an axis adjacent thereto among all axes of configuration of the machine. However, an individual error is present in each of the axes and, for example a positioning error affects a machining accuracy in the case of the linear axis. The positioning error is measured in advance by using a measuring instrument such as a laser length measuring instrument or the like, and is applied to correction of the positioning error.

As a position detector of the machine tool, a rotary encoder for controlling a rotation of a motor, or a linear encoder, which is a direct detector, as a device for detecting the position with high degree of accuracy, is employed. These position detectors are formed of a material different from casting, which is a general component material of the machine tool. Therefore, a correction table is prepared by setting coefficients of linear expansion of principal materials which constitute the position detector, obtaining temperatures of an object at positions close to the positions of sensors thereof, and measuring a positioning error by the laser length measuring instrument. However, at the time of measurement for preparing the correction table, if correct coefficients of linear expansion are not set, or the positions of object temperature sensors to be applied are not adequate, an error, which is generally referred to as a scaling error, is generated between the stored correction table and the actual behavior of the machine if an environment temperature of the installed machine is changed. As a technology of correcting the scaling error, Japanese Patent Application Publication No. 2006-281335 discloses an invention in which an amount of displacement of a scale used for obtaining an amount of displacement of a fixing position of a workpiece on the table is obtained from a product of a temperature for estimation of thermal displacement obtained on the basis of a difference between the scale temperature and the reference temperature, a difference between a coordinate of a position of a blade tip and a coordinate of a position of a scale detector, and a coefficient of linear expansion of the scale.

However, since the scaling error varies not only depending on the temperature, but also depending on other causes, it is difficult to correct the scaling error only by temperature information.

SUMMARY OF THE INVENTION

Accordingly, it is an object of the invention to provide a geometric error identification method for a multi-axis machine tool being capable of identifying geometric errors among adjacent axes and scaling errors of respective translation axes and correcting the errors with high degree of accuracy, and to provide the multi-axis machine tool.

In order to achieve the above-described object, a first aspect of the invention provides a method of identifying a geometric error relating to two or more translation axes and at least one rotation axis and correcting a scaling error of the translation axes by a control device of a multi-axis machine tool. The multi-axis machine tool includes a main spindle on which a tool can be mounted and a table on which a workpiece is retained, and the main spindle and the table are configured to move relative to each other by the control device via the translation axes and the rotation axis so that the workpiece is machined with the tool. The method comprises a measuring step of indexing a position of a measured jig mounted on one of the main spindle and the table into a plurality of angles around the rotation axis, and measuring the position of the measured jig at indexed positions by using a position measuring sensor mounted on the other one of the main spindle and the table, a geometric error calculation step of calculating a geometric error from the measured position of the measured jig, an ellipse-expression calculation step of calculating an ellipse approximate expression by an arc trajectory measured by operating the rotation axis, and an error correcting step of calculating and correcting the scaling error of the translation axes from the calculated ellipse approximate expression.

A second aspect of the present invention provides the method according to the first aspect, in which the error correcting step is executed when a difference between a long diameter and a short diameter of the ellipse approximate expression exceeds a predetermined threshold value.

A third aspect of the present invention provides the method according to the second aspect, in which the threshold value is set on the basis of an amount of change per unit length.

A fourth aspect of the present invention provides the method according to the first aspect, in which a correction of the scaling error is expressed by a primary expression, and correction of the scaling error is achieved by setting a new positioning error correction table with the primary expression reflected on a gradient of the positioning error correction table of the translation axes in the error correcting step.

A fifth aspect of the present invention provides the method according to the first aspect, in which the error correcting step includes calculating a difference between detected temperatures of temperature sensors provided in the vicinity of detectors of respective translation axes and a detected temperature of a temperature sensor provided at a reference arbitrary position, and distributing the amount of correction of the scaling error at a ratio of the difference of the detected temperature for correction.

A sixth aspect of the present invention provides the method according to the fifth aspect, in which the amount of correction of the scaling error is corrected by using a coefficient of linear expansion of a structure on which the measured jig is installed.

A seventh aspect of the present invention provides the method according to the first aspect, in which the error correcting step includes setting the translation axis which serves as a reference in advance, reflecting a difference of the scaling error on the remaining translation axes for correction.

In order to achieve the above-described object, according to an eighth aspect of the invention, there is provided a multi-axis machine tool including a main spindle on which a tool can be mounted and a table on which a workpiece is retained configured to move relative to each other by a control device via two or more translation axes and at least one rotation axis so that the workpiece is machined with the tool, wherein the control device is capable of executing a geometric error identification method according to the first aspect of the invention.

According to the invention, not only the identification of the geometric error of the adjacent axes, but also the scaling errors of the translation axes can be corrected simultaneously so that further high-accuracy machining is achieved.

In particular, since not only temperature information, but also the direct scaling error is identified from the arc trajectory obtained in the geometric error identification, correction of the scaling error with high degree of accuracy may be realized.

DETAILED DESCRIPTION OF THE INVENTION

Embodiments of the invention will be described with reference to the drawings.

Figure 1:
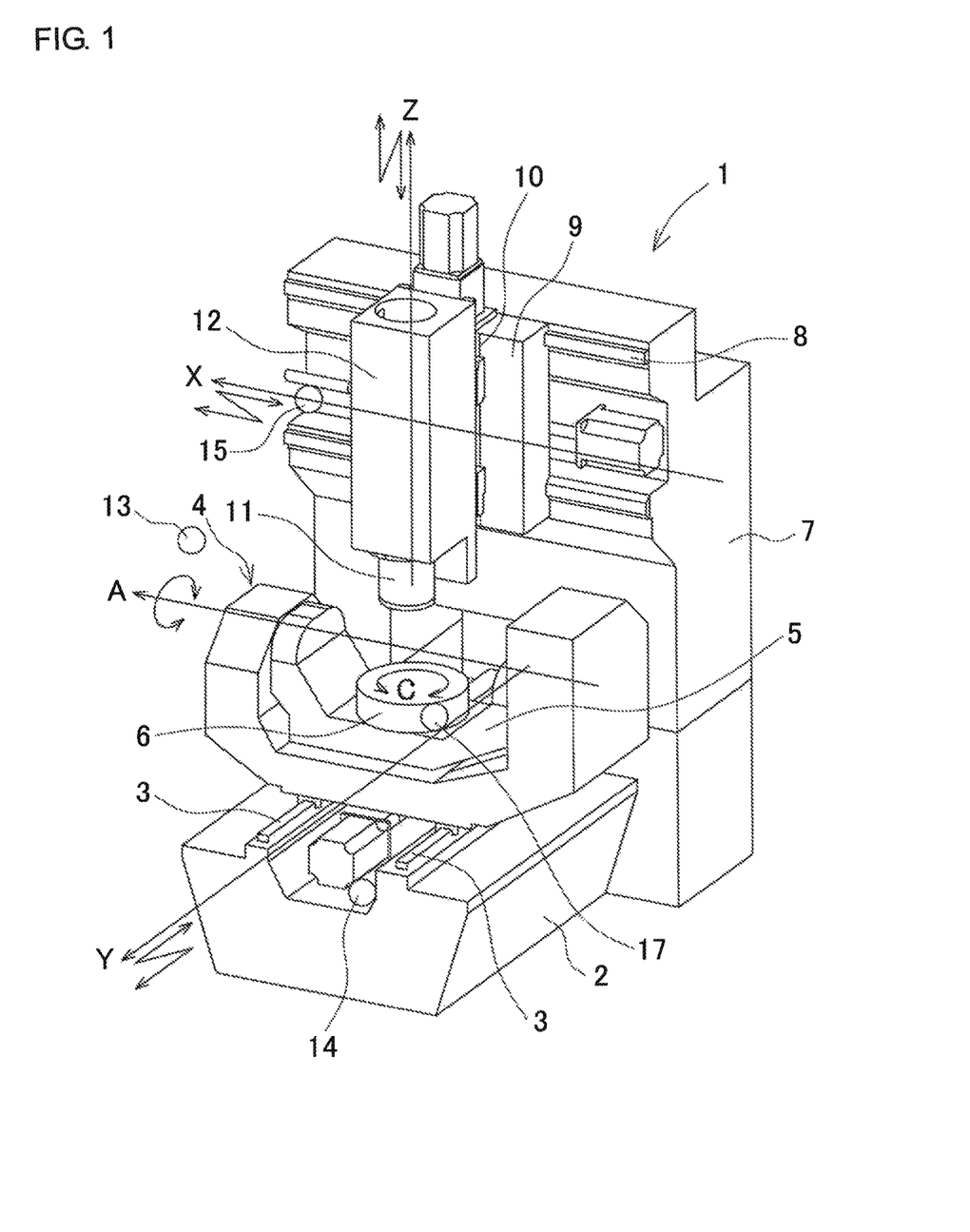
FIG. 1 is a perspective view of a 5-axis control machining center.

FIG. 1 is an example of a multi-axis machine tool, and is a perspective view of a 5-axis control machining center 1 in which an order of axes configuration from a workpiece to a tool is a workpiece, a C-axis, an A-axis, a Y-axis, an X-axis, a Z-axis, and a tool. The X-axis, the Y-axis, and the Z-axis in FIG. 1 are orthogonal 3-axes (translation axes), and the Y-axis direction is defined as a fore-and-aft direction, the X-axis direction is defined as a lateral direction, and the Z-axis direction is defined as a vertical direction.

Y-axis guides 3 and 3 are formed on an upper surface of a bed 2, and an AC axis unit 4 having a Trunnion structure is installed on the Y-axis guides 3 and 3 so as to be movable in the Y-axis direction. The AC axis unit 4 includes a cradle 5 formed into a U-shape wide in the lateral direction in front view, and the cradle 5 is capable of rotating and inclining about the A-axis parallel to the X-axis direction by A-axis drive mechanisms (not illustrated) integrated on the left and the right. The AC axis unit 4 includes a table 6 for placing a workpiece, which corresponds to a machining object on an upper surface of the cradle 5, and the table 6 is rotatable by 360 degrees about the C-axis parallel to the Z-axis by a C-axis drive mechanism (not illustrated) integrated in the cradle 5.

A cross rail 7 having an inverted U-shape is fixed to the bed 2 so as to straddle the Y-axis guides 3 and 3, and an X-axis guide portion 8 is formed on a front surface of the cross rail 7. A RAM saddle 9 is provided on the X-axis guide portion 8 so as to be movable in the X-axis direction. The RAM saddle 9 is provided with a Z-axis guide portion 10, and the Z-axis guide portion 10 is provided with a main spindle head 12 having a main spindle 11 at a lower end thereof so as to be movable in the Z-axis direction. The RAM saddle 9, the AC axis unit 4 and the main spindle head 12 are configured to be movable by a ball screw installed in parallel to guide surfaces of the respective guide portions, and a servo motor coupled to the ball screw. An NC apparatus (control device), which is not illustrated, is provided on the 5-axis control machining center 1, and driving of the respective members such as the AC axis unit 4 and the main spindle head 12 in the directions of the respective axes is controlled by the NC apparatus.

The 5-axis control machining center 1 turns and rotates the workpiece fixed to the table 6 about the A-axis and the C-axis, and moves in the Y-axis direction. Meanwhile, a multi-surface machining is performed on the workpiece by moving the main spindle 11 on which the tool is mounted in the X-axis and the Z-axis.

Reference numeral 13 denotes a temperature sensor configured to measure an environmental temperature. A temperature sensor 14 is installed in the vicinity of a position where a Y-axis linear scale, which is not illustrated, is installed on the bed 2. A temperature sensor 15 is installed on the cross rail 7 in the vicinity of a position of installation of an X-axis linear scale, which is not illustrated.

Figure 2:
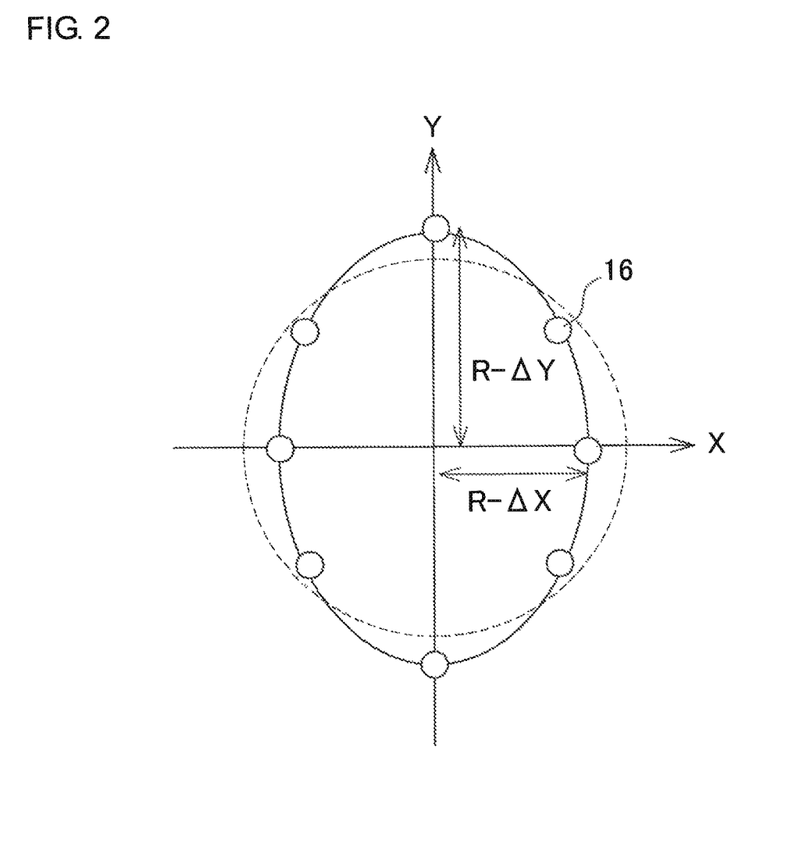
FIG. 2 is an explanatory drawing illustrating a long ellipse component by a scaling error.

In the 5-axis control machining center 1 configured as described above, scaling errors $\Delta X$ and $\Delta Y$ exist in respective axes of an XY plane. It is generally known that an ellipse as expression (1) given below is obtained when a circular trajectory having a radius R is drawn as illustrated in FIG. 2.

$$\frac{X^2}{(R-\Delta X)^2} + \frac{Y^2}{(R-\Delta Y)^2} = 1 \quad (1)$$

Figure 3A:
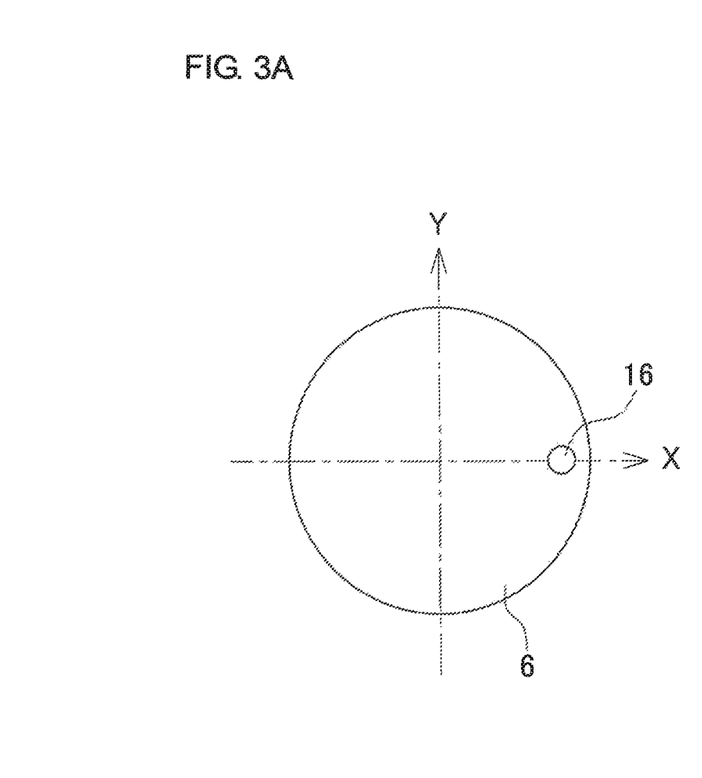
FIGS. 3A and 3B are a plan view and a side view illustrating a target ball in a state of being fixed to a table, respectively.
Figure 3B:
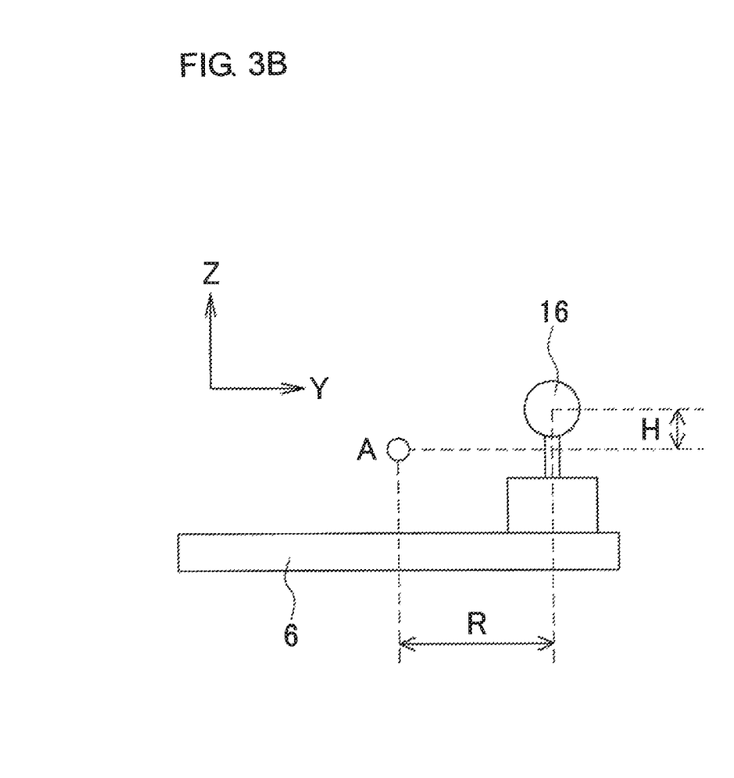

In the case where a right angle error y is identified actually by using a touch probe as a position measuring sensor and a target ball as a measured jig, a target ball 16 is fixed to a position apart from a center of rotation of the table 6 by R as illustrated in FIG. 3. In this example, assuming that the center of turning of the A-axis is on a center line of the C-axis, center coordinates $[X_0, Y_0, Z_0, A_0, C_0]$ of the target ball 16 in the case where an intersection between the center line of the C-axis and the center of turning of the A-axis is set as a point of origin of the coordinate are set as expression (2) given below. In expression (2), H is a distance from the point of origin of the coordinate to the center of the target ball 16.

$$\begin{bmatrix} X_0 \\ Y_0 \\ Z_0 \\ A_0 \\ C_0 \end{bmatrix} = \begin{bmatrix} R \\ 0 \\ H \\ 0 \\ 0 \end{bmatrix} \quad (2)$$

In the example in FIG. 2, there are 8 measurement points in a measurement range from 0 degree to 360 degrees, the indexed pitch is 45 degrees. Therefore, the C-axis is indexed at 45 degrees pitches, and the coordinate of the target ball 16 is measured by a touch probe (not illustrated) mounted on the main spindle every time when indexing is performed (measuring step).

Subsequently, a geometric error is identified from the measured coordinate. Like the disclosure in JP-A-2011-38902, identification of the geometric error is performed by approximating a plurality of measured values of the center positions into an arc and calculating an error of the center position and an error of inclination of the C-axis and inclination errors of the X-axis and the Y-axis from a primary or secondary component of the approximated arc (geometric error calculation step).

Then, the scaling errors of the X-axis and the Y-axis are confirmed by using the X-axis and the Y-axis coordinates [Xi, Yi] from the measured coordinates of the target ball 16. The ellipse expression as expression (1) may be applied if the error is only the scaling error. Actually, however, when the center of the ellipse is assumed to be [Xc, Yc] and the inclination of the ellipse is assumed to be $\theta$, a general expression of the ellipse is expression (3) given below from the geometric error such as a squareness or positional error of the center of rotation axis.

$$\left[\frac{(Xi-Xc)\cos\theta + (Yi-Yc)\sin\theta}{R-\Delta X}\right]^2 + \left[\frac{-(Xi-Xc)\sin\theta + (Yi-Yc)\cos\theta}{R-\Delta Y}\right]^2 = 1 \quad (3)$$

A coefficient of expression (3) is calculated by a method of least square from the measured data [Xi, Yi] to obtain an approximate expression of the ellipse, and correction of the scaling error is performed. Detailed procedure of the correction will be described with reference to a flowchart in FIG. 4.

Figure 4:
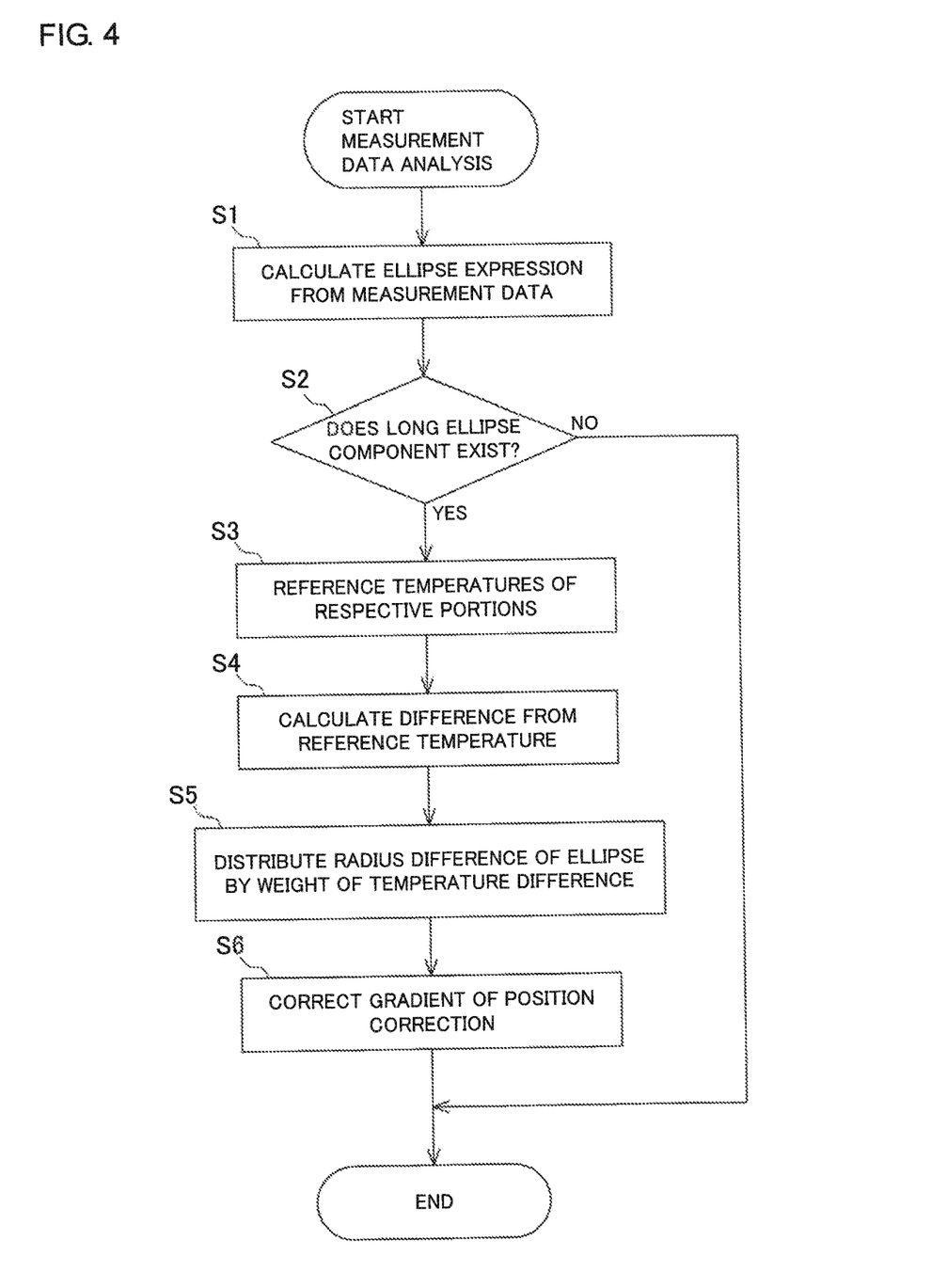
FIG. 4 is a flowchart of a correction process of a scaling error.

First of all, in order to determine the scaling errors of the X-axis and the Y-axis, expression (3), namely, an ellipse approximate expression, is obtained from the measured data of the X-axis coordinate and the Y-axis coordinate (S1, ellipse-expression calculation step).

Subsequently, $(R-\Delta X)$ and $(R-\Delta Y)$ which correspond to obtained long diameter and short diameter are compared, and whether there exists a difference and a long ellipse is formed is determined (S2). Here, from a threshold value $\varepsilon$ [mm/mm] set in advance (the amount of change per unit length), it is determined that the long ellipse component exists when $(\varepsilon \times R) < |\Delta X - \Delta Y|$ is satisfied.

If the long ellipse component exists according to the determination in S2, respective temperatures $T_1$, $T_2$, and T3 of the respective temperature sensors 13 to 15 are obtained (S3). In contrast, if no long ellipse component exists, the process is terminated without performing the correction of the scaling error.

Subsequently, the temperature $T_1$ of the temperature sensor 13, which corresponds to an environmental temperature is set as a reference temperature, and a temperature difference of the X-axis $\Delta T_X = T_3 - T_1$, and a temperature difference of the Y-axis $\Delta T_Y = T_2 - T_1$ are calculated (S4). However, the reference temperature is not limited to the environmental temperature, and temperatures at arbitrary positions such as the temperature of the reference temperature sensor of an oil controller may be employed, or the temperature of a temperature sensor installed at a position which is not affected by a hydraulic instrument may be employed.

Subsequently, from the difference of the scaling errors $(\Delta X - \Delta Y)$, coefficients $k_x$ and $k_y$ for correcting the gradients of the positional correction of the respective axes are distributed as expression (4) by a weight of the amount of temperature change (S5).

$$\begin{bmatrix} k_X \\ k_Y \end{bmatrix} = \frac{(\Delta X - \Delta Y)}{R} \begin{bmatrix} \frac{\Delta T_X}{\Delta T_X + \Delta T_Y} \\ \frac{\Delta T_Y}{\Delta T_X + \Delta T_Y} \end{bmatrix} \qquad (4)$$

Although the temperature sensor, which corresponds to the reference temperature is used here, if cutting water is used, a temperature of the table on which the target ball is installed is different from the reference temperature, and the temperature difference may affect the measured R. Therefore, a temperature sensor 17 (FIG. 1) configured to measure a temperature of an upper surface of the table 6 on which the target ball is to be installed is newly provided, and R' in expression (5) given below is applied to R in expression (4), where T4 is the table temperature, and a is a coefficient of linear expansion of the machine, so that correction of higher level is enabled.

$$R' = R \cdot \alpha \cdot (T_4 - T_1) \qquad (5)$$

Finally, coefficients of correction are reflected on positional error correction tables F(X) and F(Y) as expression (6) given below, and new positional error correction tables F'(X) and F'(Y) are set, whereby the scaling errors are corrected (S6, S3 to S6 are error correcting steps).

$$\begin{bmatrix} F'(X) \\ F'(Y) \end{bmatrix} = \begin{bmatrix} k_X \cdot F'(X) \\ k_Y \cdot F'(Y) \end{bmatrix} \qquad (6)$$

According to a geometric error identification method of the embodiment described above, not only the identification of the geometric error of the adjacent axes, but also the scaling errors of the translation axes can be corrected simultaneously so that further high-accuracy machining is achieved.

In particular, not only temperature information, but also the direct scaling error is identified from the arc trajectory obtained in the geometric error identification, correction of the scaling error with higher degree of accuracy may be realized.

Although the correction gradient of a positional error correction table is distributed in accordance with the temperature difference among the respective portions in the embodiment described above, the same effect is achieved by a method of setting a linear axis, which serves as a reference, in advance and reflecting the difference in scaling error on other axes.

In addition, although the case where the scaling errors of the X-axis and the Y-axis are corrected has been described in the embodiment described above, when correcting the scaling errors of the Y-axis and the Z-axis, the C-axis is fixed to a given angle, and then the ellipse approximate expression can be identified in the same manner from the trajectory of the Y-axis coordinate and the Z-axis coordinate from the measured result obtained by positioning the A-axis on a plurality of indexing conditions.

Furthermore, the invention is also applicable even though the arrangements of the target ball and the touch probe are switched between the main spindle and the table.

The multi-axis machine tool is not limited to the 5-axis control machining center, and if the multi-axis machine tool has the two or more translation axes and at least one rotation axis, a configuration in which two or more rotation axes are provided on the main spindle side or a configuration in which one each of the rotation axes are provided on the main spindle side and the table side is also applicable. Therefore, the invention is not limited to the machine tool of the machining center base, but a composite machine tool on the basis of a lathe is also applicable.

As long as the position in the direction of the translation axes of the table can be measured, the invention may be applied not only to the linear scale, but may be other detectors such as a rotary encoder.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A geometric error identification method of a multi-axis machine comprising a main spindle and a table, the method comprising:

rotating one of a main spindle and a table to a plurality of indexed angular positions, the main spindle configured to mount a tool thereon, the table configured to retain a workpiece thereon, the main spindle and the table configured to be moved, based on signals from a control device, relative to each other along at least a first translation axis and a second translation axis, and with respect to at least a first rotation axis, so that the workpiece is machined with the tool, a jig mounted on said one of the main spindle and the table;

measuring respective positions of the jig at said indexed angular positions using a position measuring sensor mounted on the other one of the main spindle and the table to obtain a plurality of measured positions of the jig at respective indexed angular positions;

calculating any translational error in the position of the first translation axis from the plurality of measured positions of the jig;

calculating any translational error in the position of the second translation axis from the plurality of measured positions of the jig;

calculating any inclination error in the first rotation axis from the plurality of measured positions of the jig;

calculating an ellipse approximate expression approximating an arc trajectory derived from the plurality of measured positions of the jig; and calculating and correcting any scaling error of the first translation axis and any scaling error of the second translation axis from the calculated ellipse approximate expression.

2. The geometric error identification method of a multi-axis machine according to claim 1, wherein a correction of the scaling error is expressed by a primary expression, and correction of the scaling error is achieved by setting a new positioning error correction table with the primary expression reflected on a gradient of the positioning error correction table of the translation axes in the error correcting step.

3. The geometric error identification method of a multi-axis machine according to claim 1, wherein said calculating and correcting a scaling error comprises calculating a difference between detected temperatures of temperature sensors provided in respective vicinities of detectors of respective translation axes and a detected temperature of a temperature sensor provided at a reference position, and distributing an amount of correction of the scaling error at a ratio of the difference in detected temperature for correction.

4. The geometric error identification method of a multi-axis machine according to claim 3, wherein the amount of correction of the scaling error is corrected by using a coefficient of linear expansion of a structure on which the jig is installed.

5. The geometric error identification method of a multi-axis machine according to claim 1, wherein said calculating and correcting a scaling error comprises setting a first of the translation axes as a reference and calculating and correcting the scaling error for the translation axes other than the first translation axis.

6. A multi-axis machine, comprising:
   a main spindle configured to mount a tool thereon;
   a table configured to retain a workpiece thereon,
   the main spindle and the table configured to be moved, based on signals from a control device, relative to each other along two or more translation axes and with respect to at least one rotation axis, so that the workpiece is machined with the tool, wherein
   the control device is capable of executing a geometric error identification method according to claim 1.

7. A geometric error identification method of a multi-axis machine comprising a main spindle and a table, the method comprising:
   rotating one of a main spindle and a table to a plurality of indexed angular positions, the main spindle configured to have a tool mounted thereon, the table configured to have a workpiece retained thereon, the main spindle and the table configured to be moved, based on signals from a control device, relative to each other along at least a first translation axis and a second translation axis, and with respect to at least a first rotation axis, so that the workpiece is machined with the tool, a jig mounted on said one of the main spindle and the table;
   measuring respective positions of the jig at said indexed angular positions using a position measuring sensor mounted on the other one of the main spindle and the table to obtain a plurality of measured positions of the jig at respective indexed angular positions;
   calculating any translational error in the position of the first translation axis from the plurality of measured positions of the jig;
   calculating any translational error in the position of the second translation axis from the plurality of measured positions of the jig;
   calculating any inclination error in the first rotation axis from the plurality of measured positions of the jig;
   calculating an ellipse approximate expression approximating an arc trajectory derived from the plurality of measured positions of the jig; and
   determining whether a difference between a long diameter and a short diameter of the ellipse approximate expression exceeds a predetermined threshold value.

8. The geometric error identification method of a multi-axis machine according to claim 7, wherein when said difference between a long diameter and a short diameter of the ellipse approximate expression exceeds said predetermined threshold value, calculating and correcting a scaling error of the translation axes from the calculated ellipse approximate expression.

9. The geometric error identification method of a multi-axis machine tool according to claim 7, wherein the threshold value is set on the basis of an amount of change per unit length.

* * * * *